June 9, 1964  G. A. WOOD, JR  3,136,497
DRAG CONSTRUCTION FOR FISHING REEL
Filed June 14, 1962
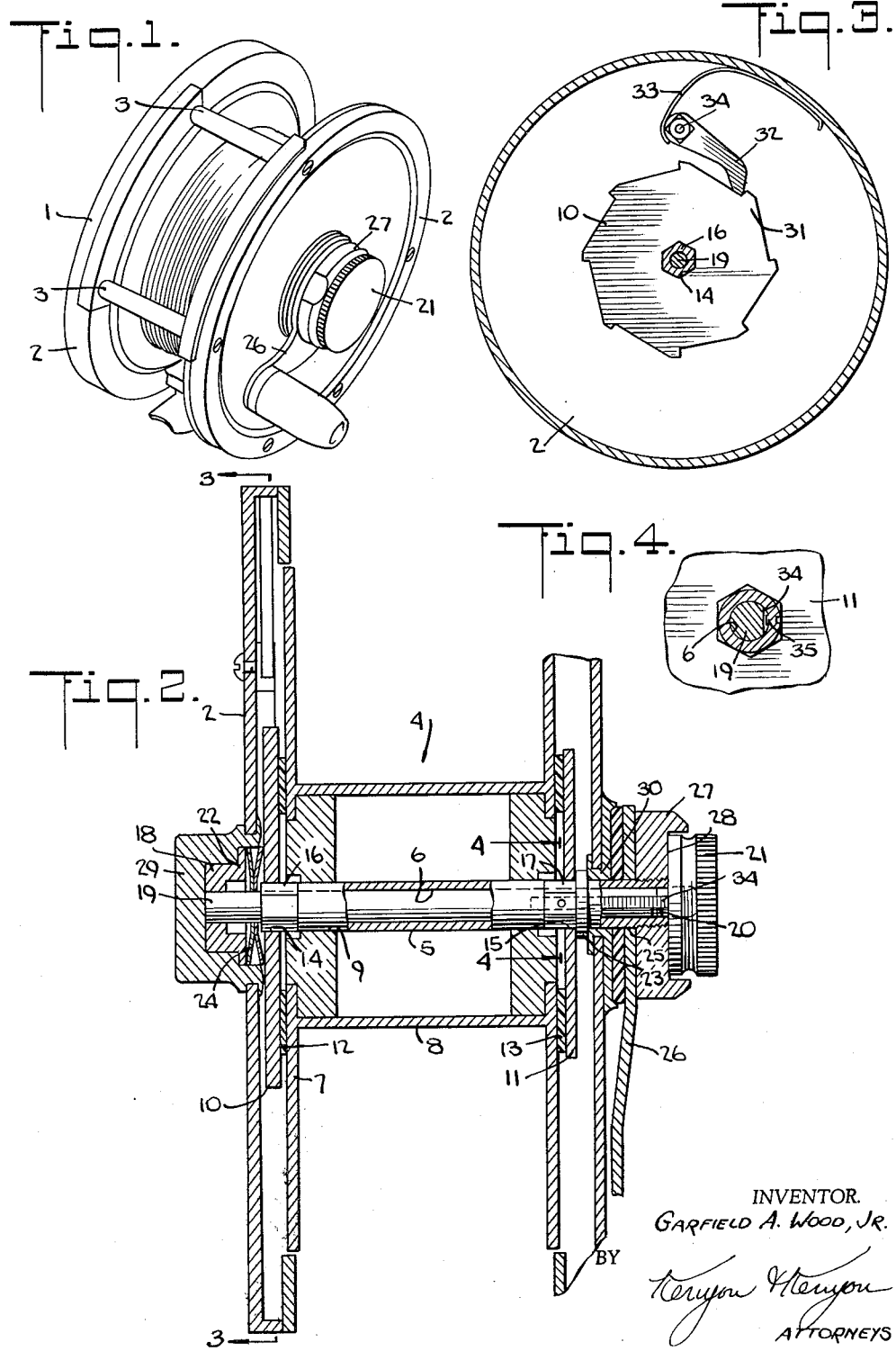
INVENTOR.
GARFIELD A. WOOD, JR.
BY
Kenyon & Kenyon
ATTORNEYS

3,136,497
DRAG CONSTRUCTION FOR FISHING REEL
Garfield A. Wood, Jr., Miami, Fla., assignor to Shakespeare Company, Kalamazoo, Mich., a corporation of Michigan
Filed June 14, 1962, Ser. No. 202,596
3 Claims. (Cl. 242—84.51)

This invention relates to fishing reels and in particular to single action for use on fly rods.

One of the objects is to provide such a reel with a novel adjustable drag mechanism which will permit line to be taken from the reel if the pull thereon exceeds a predetermined amount.

Another object is to provide such a reel with a drag mechanism in which it is not necessary to provide thrust bearings.

Another object is to provide such a reel which is of simple form and which can be made inexpensively.

Other objects and advantages will appear from the following description of a preferred form of the invention which is shown in the drawings in which:

FIG. 1 is a perspective view of a reel embodying the invention;

FIG. 2 is a cross-sectional view of the reel of FIG. 1;

FIG. 3 is a cross-sectional view taken on the line 3—3 of FIG. 2; and,

FIG. 4 is a cross-sectional view taken on the line 4—4 of FIG. 2.

The invention consists generally in a reel having a frame with a pair of spaced sides. Between the sides is rotatably mounted a spool and drag unit. This unit may be rotated freely in one direction for line retrieval but is held against rotation in the other direction although the spool may rotate in the other direction under restraint of a friction element or clutch to apply a uniform predetermined drag.

The unit comprises a drive shaft which has an axial bore therein, a spool having a pair of flat ends and an arbor with an axial bore fitted rotatably and slideably on the drive shaft. There is a pair of friction disks, one at each end of the spool, each have a central aperture slideably but non-rotatively fitted on the drive shaft. The disks are disposed in face to face relationship to the ends of the spool and form a friction clutch or drag.

Means are provided to adjustably clamp the disks and spool together. They include a cylindrical bearing member which engages the outer face of one disk, has a rod secured thereto extending through the bore in the drive shaft to engage a nut which bears on the end of the drive shaft and a shoulder on the drive shaft to engage the other disk and a spring means incorporated in said clamping means tending to oppose the clamping forces or to put it another way to make them resilient.

There are also means to restrain the unit against rotation in a counter line retrieving direction comprising ratchet teeth on one of said disks and a spring actuated pawl on the frame.

There are bearings on the sides of the frame, one to receive the cylindrical bearing member and the other to receive the drive shaft.

A crank is provided on the drive shaft.

Referring specifically to the drawings the frame 1 has sides 2 and pillars 3 connecting them and holding them in spaced relationship.

Disposed between the sides of the frame is a reel and drag unit designated generally as 4. It consists of a drive shaft 5 which has an axial bore 6 and a spool consisting of flat end plates 7 and an arbor 8 which has an axial bore 9 which slideably and rotatably receives the drive shaft 5.

A pair of friction disks 10 and 11 are disposed at the ends of the spool in face to face relation with the flat end plates 7. Relatively soft and resilient friction rings 12 and 13 are provided on the end plates 7 to increase the coefficient of friction and to give a soft acting clutch.

The disks 10 and 11 are centrally apertured as at 14, and 15 to slidably fit on the drive shaft 5 but means are provided to prevent relative rotation between the shaft 5 and the disks 10 and 11. To this end the end 16 of the drive shaft 5 is given a hexagonal form and the aperture in the disk 10 is likewise given a mating form. The drive shaft is also provided with an enlarged flattened portion 17 and the aperture 15 is of mating form.

Means are provided to adjustably clamp the disks and spool together. These include a cylindrical bearing member 18 which has secured thereto a rod 19 which extends through the bore 6 of the drive shaft and terminates in a screw-threaded end 20 which received a nut 21. The bearing member 18 has a portion 22 which overlies a portion of the disk 10 and is adapted to exert pressure on the outer face of said disk. The drive shaft 5 has a shoulder 23 which faces the disk 11 and overlies a portion thereof and is adapted to exert pressure on said disk when tension is applied on the rod 19.

Centrally apertured dished spring washers 24 fitted over and slidably disposed on the rod 19 are biased to resist clamping action and hence provide resiliency for the clutch and tend to maintain all of the parts thereof in contact regardless of the adjustment.

The end of the drive shaft 5 is squared at 25 to receive a crank 26 which is held in place by a nut 27 which has a seat 28 for the nut 21.

The unit 4 is mounted for rotation in the frame by bearings 29 and 30. The bearing 29 is centrally disposed on one side of the frame and receives the bearing member 18 while the bearing 30 is disposed on the other side of the frame and rotatably supports the drive shaft 5.

The unit 4 may be rotated by crank 26 in line retrieving direction but is held against counter rotation by a ratchet mechanism consisting of ratchet teeth 31 cut in the periphery of one of the disks, i.e. the disk 10. A spring pawl 32 with spring 33 biased to urge it toward the teeth 31 is pivoted at 34 on the frame.

In order to permit adjusting of the drag, a flat 34 is provided on the rod 19. An indent 35 provided in the shaft 5 engages flat 34 and restricts relative rotary motion between the drive shaft 5 and the rod 19 while permitting sliding axial motion therebetween.

It will be apparent that in operation line may be retrieved by rotating the unit 4 by means of handle 26 but that reverse motion is not permitted. However, line can be taken from the reel through rotation of the spool against the frictional resistance of the clutch mechanism and that the resistance can be varied easily by means of the nut 21.

With the particular arrangement of parts contemplated by this invention this is achieved without expensive thrust bearings since the clutch or drag adjustment is accomplished by tension adjustment entirely within the spool and drag unit.

It will be appreciated that the invention can take other forms than that specifically shown and described above by way of example. The scope of the invention is not limited to this specific form but is defined in the appended claims.

What is claimed is:

1. In a fishing reel having a frame comprising a pair of spaced sides, a spool and drag unit disposed between said sides for rotation in one direction for line retrieval comprising a drive shaft having an axial drive shaft bore, a spool having flat end plates and a connecting arbor having an axial spool bore slidably and rotatably fitted on said drive shaft, a pair of friction disks each having a central aperture slidably fitted on said drive shaft, and having means interconnecting it to said drive shaft against relative rotary movement, a disk being disposed at each end of said spool and in face to face engagement with an outer face of an end plate, means for adjustably clamping said disks in frictional engagement with said spool comprising a cylindrical bearing member disposed adjacent the outer side of one disk and co-axially of said drive shaft and having means to engage said disk including spring means, means on said drive shaft facing the outer side of the other disk and engageable therewith, a rod secured to said cylindrical bearing member and extending slidably through said drive shaft bore and adjusting means engaging said rod and an outer end portion of said drive shaft to exert tension on said rod and means for restraining said unit against rotation in a counter line retrieval direction comprising ratchet teeth on one of said disks and a pawl on said frame, and a bearing on one side of said frame to rotatably support said cylindrical bearing member and a bearing on the other side of said frame to rotatably support said drive shaft, and means to rotate said unit in line retrieval direction.

2. In a fishing reel having a frame comprising a pair of spaced sides, a spool and drag unit disposed between said sides for rotation in one direction for line retrieval comprising a drive shaft having an axial drive shaft bore, a spool having flat end plates and a connecting arbor having an axial spool bore slidably and rotatably fitted on said drive shaft, a pair of friction disks each having a central aperture slidably fitted on said drive shaft, and having means interconnecting it to said drive shaft against relative rotary movement, a disk being disposed at each end of said spool and in face to face engagement with an outer face of an end plate, means for adjustably clamping said disks in frictional engagement with said spool comprising a cylindrical bearing member disposed adjacent the outer side of one disk and co-axially of said drive shaft and having means to engage said disk including spring means, means on said drive shaft facing the outer side of the other disk, and engageable therewith, a rod secured to said cylindrical bearing member and extending slidably through said drive shaft bore and adjusting means engaging said rod and an outer end portion of said drive shaft to exert tension on said rod and means for restraining said unit against rotation in a counter line retrieval direction, and a bearing on one side of said frame to rotatably support said cylindrical bearing member and a bearing on the other side of said frame to rotatably support said drive shaft, and means to rotate said unit in line retrieval direction.

3. In a fishing reel having a frame comprising a pair of spaced sides, a spool and drag unit disposed between said sides for rotation in one direction for line retrieval comprising a drive shaft having an axial drive shaft bore, a spool having flat end plates and a connecting arbor having an axial spool bore slidably and rotatably fitted on said drive shaft, a pair of friction disks each having a central aperture slidably fitted on said drive shaft, and having means interconnecting it to said drive shaft against relative rotary movement, a disk being disposed at each end of said spool and in face to face engagement with an outer face of an end plate, means for adjustably clamping said disks in frictional engagement with said spool comprising a cylindrical bearing member disposed adjacent the outer side of one disk and co-axially of said drive shaft and having means to engage said disk including spring means, means on said drive shaft facing the outer side of the other disk and engageable therewith, a rod secured to said cylindrical bearing member and extending slidably through said drive shaft bore and adjusting means engaging said rod and an outer end portion of said drive shaft to exert tension on said rod, and a bearing on one side of said frame to rotatably support said cylindrical bearing member and a bearing on the other side of said frame to rotatably support said drive shaft, and means to rotate said unit in line retrieval direction.

References Cited in the file of this patent

UNITED STATES PATENTS

| | | |
|---|---|---|
| 2,022,042 | Knowles | Nov. 26, 1935 |
| 2,182,423 | Cabassa | Dec. 5, 1939 |
| 2,190,398 | Bugatti | Feb. 13, 1940 |
| 2,269,808 | Cabassa | Jan. 13, 1942 |
| 2,298,481 | Hayes | Oct. 13, 1942 |
| 3,017,135 | Wood | Jan. 16, 1962 |